Nov. 9, 1948.   J. M. AURILIO ET AL   2,453,293
HORIZONTAL LIQUID CURRENT SEPARATOR
Filed Dec. 6, 1944   2 Sheets-Sheet 1

INVENTOR
Joseph M. Aurilio
Jack H. Schecter
BY
John H. Hanrahan

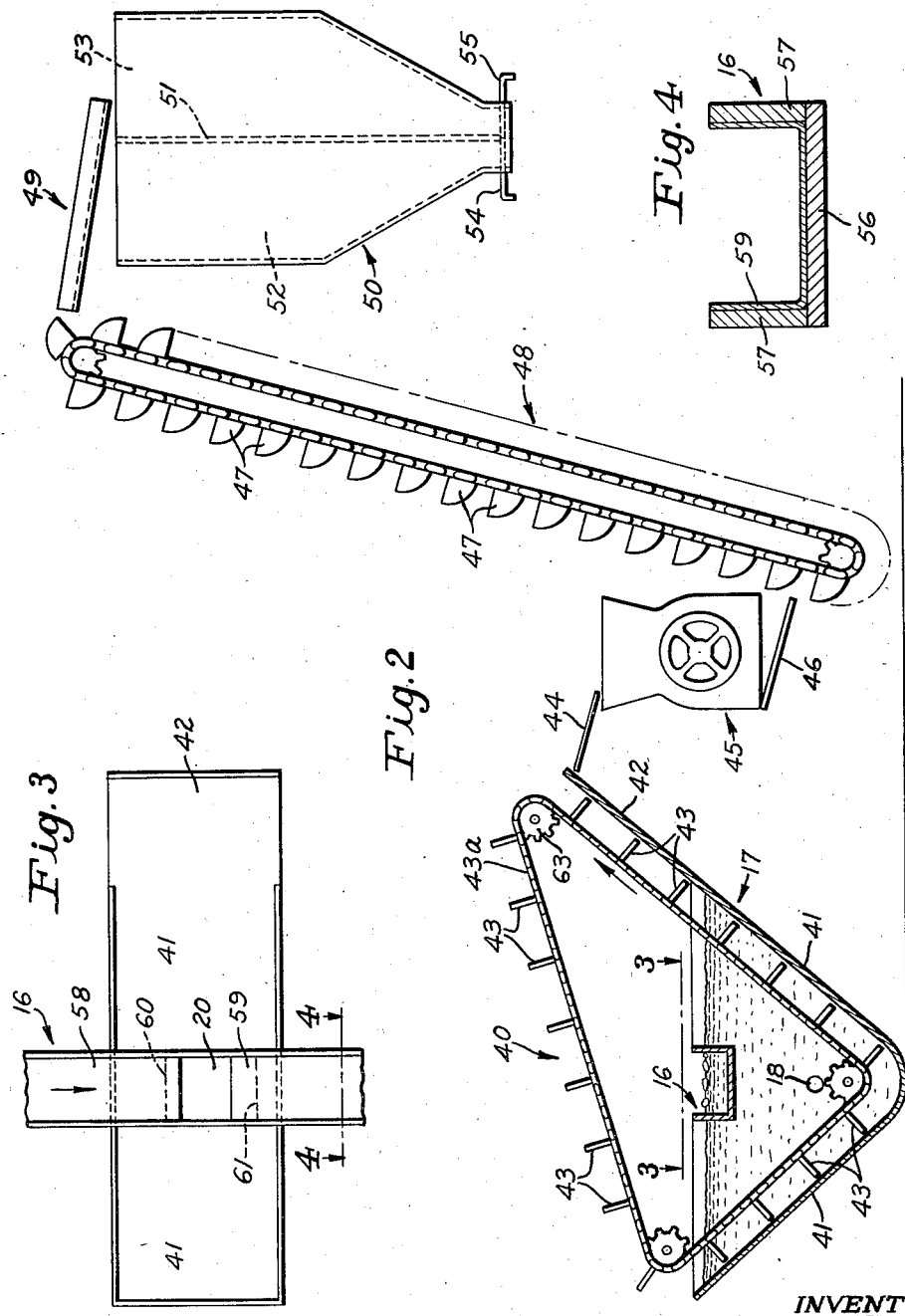

Patented Nov. 9, 1948

2,453,293

UNITED STATES PATENT OFFICE 2,453,293

HORIZONTAL LIQUID CURRENT SEPARATOR

Joseph M. Aurilio, Fairfield, and Jack H. Schecter, Bridgeport, Conn., assignors to McNeil Bros. Inc., Bridgeport, Conn., a corporation of Connecticut Application December 6, 1944, Serial No. 566,830

4 Claims. (Cl. 209—156)

This invention relates to new and useful improvements in apparatus and method for the separation of materials and has particular relation to an improved apparatus and method for separating materials by the flotation process.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 2 is a view taken as along the plane of the line 2—2 of Fig. 1;

Fig. 3 is a plan view, as along the line 3—3 of Fig. 2, of a portion of the trough or spill-way showing the same in relation to the settling tank; and Fig. 4 is an enlarged sectional view taken as along the line 4—4 of Fig. 3.

Figure 1:
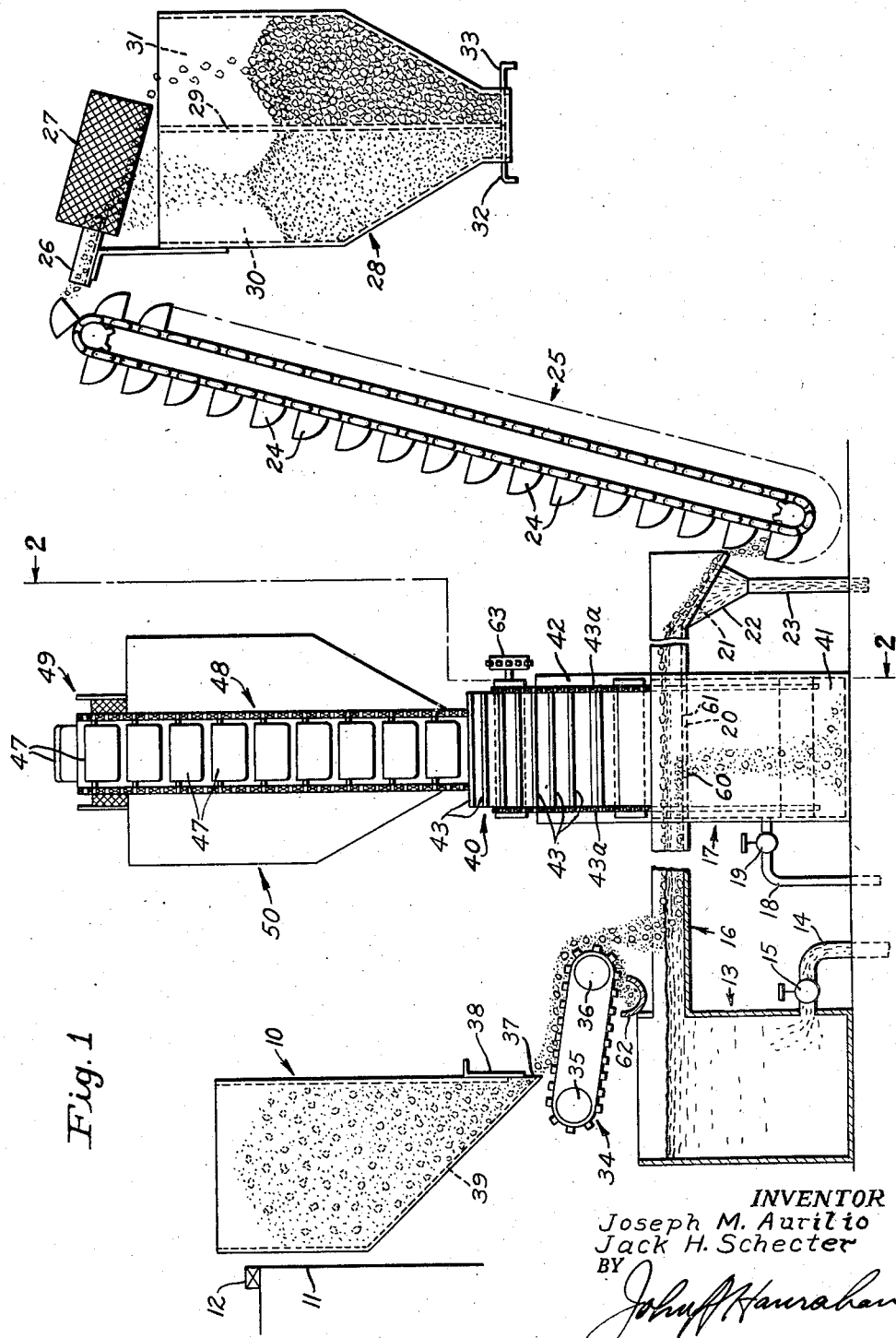
Fig. 1 is a view partly in side elevation and partly in section and showing the apparatus of the invention.

Our apparatus and method as herein disclosed provides for a substantially continuous operation in the separation of a mixture of materials into light and heavy materials, this reference to light and heavy materials being with regard to the specific gravity of such materials. The invention is herein disclosed with specific reference to the separation of coke and cinder from one another. This provides for the salvaging of the coke for further use as fuel and the obtaining of substantially pure cinder for use in making driveways, cinder block, etc.

Referring in detail to the drawings a bin for receiving aggregate as from dump trucks or the like is shown at 10 and the same is shown adjacent a ramp 11 having a stop block 12 thereon and against which a truck may be backed to dispose its rear end over the bin so that the truck will be dumped directly into the bin. At an elevation lower than that of the bin 10 is a liquid supply tank 13 to which liquid, as water, is supplied in large volume through a pipe 14 equipped with a valve 15 whereby the supply of liquid may be varied or cut-off.

Communicating at one end with the upper portion of tank 13 is a trough 16 and the arrangement is such that the trough is lower than the top edge of the tank whereby the trough is continuously receiving liquid from the tank in a volume and to a depth depending on the rate of supply of the liquid to the tank. With the construction shown and thus far described it will be clear that the rate of flow of the liquid through the trough may be controlled by manipulation of the valve 15.

Trough 16 passes through the upper portion of a settling tank 17 to which liquid is supplied as through a pipe 18 having a manually manipulable control valve 19 therein. The trough 16 is so located with reference to the top of the settling tank 17 that the bottom of the trough, particularly the portion thereof having an opening or throat 20 therethrough, that the level of liquid in the tank 17 may be maintained above the floor or bottom of the trough. Thus in Fig. 2 the level of the liquid in the settling tank 17 is shown as the same as that in the trough 16.

Beyond the tank 17 the trough 16 discharges onto a screen or perforated member 21 below which is a funnel-like means 22 to catch the material passing through the screen and direct it into a discharge pipe 23. The liquid flowing through the trough passes through the screen 21 and is discharged through the pipe 23 as are any "fines" or small particles of the material which may be carried by the liquid flow to the end of the trough. The larger pieces of material passing over the inclined screen 21 are discharged into the buckets 24 of a conveyor or endless carrier 25 which elevates such material and discharges it into or onto a chute 26 in turn delivering the material to a barrel or roller screen 27.

Below the screen 27 is a hopper 28 partitioned by a wall 29 into two hoppers or chambers 30 and 31 each having an outlet and which outlets are controlled by valves 32 and 33, respectively. Hopper 28 is in elevated relation to the tank 13 and trough 16 and is in fact at a height whereby trucks may be run under it to directly receive the material from its chambers. Screen 27 extends across the partition 29 so that the material of smaller size passes through the screen and into the chamber 30 while the pieces of larger size fall out of the lower end of the screen into chamber 31.

Below the bin 10 but above the trough 16 is a feeder and distributor means 34 in the form of a carrier or conveyor being endless in character and running on a pair of pulleys 35 and 36. The material or aggregate from the bin 10 passes out through an opening 37 the size of which is determined by the position of a slidable gate 38 and which gate may in fact be used to completely close the opening 37. Feeder 34 has its discharge end located over the trough 16 at a place in advance of the opening or throat 20 therethrough.

It will be seen that the weight of the material in bin 10 is on the inclined bottom wall 39 of the latter and not on the feeder 34 and that the rate at which the material is discharged onto the feeder will depend on the position of the gate 38. The permitted size of opening 37 together with the speed at which feeder 34 is operated will determine the amount or rate of supply of the material or aggregate to the trough and it is to be fed to the trough at a rate, in such relation to the flow of liquid in the trough, that the material is constantly carried away from the place beneath the discharge end of the feeder and is not permitted to pile up in the trough.

As the material from bin 10 is carried along by the flow of the liquid in the trough the heavier portions (in the present instance the cinders) sink to the bottom of the trough and settle out through the opening 20 into the settling tank 17 while the lighter portions of the material (in this instance the coke) is carried by the liquid flow across the opening 20 and after discharge from the end of the trough are lifted to the hopper 28 as above set forth. The coke content of many so-called "cinder dumps" runs very high and thus the present invention provides for the recovery of a large quantity of valuable fuel.

The cinders which have settled out through the opening 20 into the settling tank 17 are removed therefrom by a scrapper or conveyor means generally designated 40. Tank 17 is shown as somewhat V-shaped and the arrangement of parts is such that the trough 16 passes between the arms of such V-shaped tank as best shown in Fig. 2. One wall or arm 41 of the tank is extended as at 42 and the means 40 is operated in a direction such that its blades 43 will drag the cinders (or other settled-out material) up the wall 41 and its extension 42.

Means 40 is an open structure including a series of the cross blades 43 suitably spaced and as these blades drag the cinders or other material up the wall 41, and particularly its extension 42, above the level of the liquid in the tank such material has a chance to drain and is tumbled along further aiding in its draining. Structure 40 in addition to the blades 43 includes a pair of spaced chains 43a between which the cinders may pass to settle to the bottom of tank 17. On passing from the upper edge of wall extension 42 the material drops onto an inclined screen or other perforated means 44. This drop further assists in removing the liquid from the material.

From means 44 the material passes into a crusher 45, preferably of the centrifugal type, and the crushed material discharged from the latter is directed by a chute 46 into the buckets 47 of an elevating means or conveyor generally designated 48. If the material being fed to the crusher is too wet it may first be passed through a centrifugal dryer or other means to extract additional amounts of the liquid from the material. Conveyor 48 deposits the material onto a shaker screen 49.

The latter is over a hopper 50 and extends across a wall 51 within said hopper and dividing it into chambers 52 and 53 the outlets of which are controlled by valves or gates 54 and 55, respectively. It will be clear that of the material delivered to the screen 49 the smaller pieces will pass through the screen and into the chamber 52 while the larger pieces will pass off the end of the screen and into the chamber 53. Hopper 50 is also in such an elevated position that trucks may be run under it to be directly loaded on opening of either of the valves or gates 54 and 55.

A feature of the invention is the floating of the coke or lighter material of the aggregate across the body of liquid in the settling tank by or in a stream of liquid passing through such body of liquid. The trough 16 (see Fig. 4) is shown as including an outer bottom 56 and outer sides 57 of wood and an inner metal liner. This liner comprises a pair of transversely U-shaped pieces 58 and 59. Opening 20 through the bottom 56 extends the distance between the dotted lines 60 and 61 representing the edges of bottom 56. The metal liners 58 and 59 are adjustable toward and from one another and are shown in Fig. 3 with their adjacent ends overlying the edges 60 and 61 so that the effective size of the opening or throat 20 in such figure is less than the distance between the ends 60 and 61 of the bottom 56.

The apparatus as disclosed provides a number of variable features. For example, the size of the discharge opening 37 from bin 10 may be varied, the speed of the travel of the feeder 34 may be varied, the rate of flow of the liquid in the trough and the depth of the liquid in the trough may be varied by manipulation of valve 15, the height of liquid in the settling tank 17 may be varied by manipulation of valve 19 and the size of the opening or throat 20 may be varied by adjusting the liners 58 and 59 toward and from one another. Through these various controls the line of demarcation between the materials that will be floated across the opening 20 and those that will sink through such opening into the settling tank may be varied.

When the opening 20 is made relatively narrow and the liquid is flowing fast in the trough all but the heaviest materials will be carried across such opening. On the other extreme when the liquid flow is slow and the opening 20 is very wide all but the lightest materials will settle through the opening 20. The body of liquid in the settling tank 17 prevents any drop in the liquid level in trough 16 at the place of the opening 20 and the liquid in said settling tank being relatively stationary it is not bubbling or rushing up through such opening. Therefore there is a normal flow of the liquid in the trough across the opening 20 and the heavy materials and only the heavy materials settle out through the opening 20.

Tank 13 is of such volume that the intake of water from the pipe 14 in the lower portion of the tank does not create an undue turbulence in the water in the upper portion of the tank or in the trough. Thus portions of the material are not swept along the trough by agitation or by surges of the liquid since the latter flows at a constant rate in a steady stream. To prevent damage to the crusher 45 the pulley 36 of the feeder or spreader 34 is magnetized whereby to have metal pieces, as nails or the like, adhere to the feeder and be carried around the pulley and not dropped into the trough. As the conveyor leaves the pulley it carries the metal pieces with it and they drop from it when they pass the effective zone or field of magnetism and fall into a chute or any suitable receptacle 62. Scrapper 40 may be driven from any suitable source of power as through a sprocket wheel 63. While means for driving the other conveyors have not been shown it will be understood that such means are not new since the conveyors are of standard Having thus set forth the nature of our invention, what we claim is:

1. In a material separation apparatus, a tank, a trough including spaced side walls and a bottom wall, said trough communicating at one end with the upper portion of said tank to continuously receive liquid therefrom, means for supplying liquid to said tank in a volume sufficient to maintain a given level in the tank and trough with a constant flow through the latter, a settling tank, said trough having its bottom wall and at least the lower portions of its side walls passing through the upper portion of said settling tank below the upper edges of the walls of the latter whereby said settling tank is adapted to contain liquid to a level above the bottom wall of the trough portion passing therethrough, said trough having an opening through its bottom wall within said settling tank, means for feeding material to be separated to the liquid in said trough at a place intermediate said first tank and said opening, and said opening providing means whereby heavy portions of the material to be separated may settle out into said settling tank while the lighter portions of said material are carried across said opening by the liquid flowing through the trough.

2. In a material separation apparatus, a bin to receive the material to be separated, a tank, a trough including spaced side walls and a bottom wall, said trough communicating at one end with the upper portion of said tank to continuously receive liquid therefrom, means for supplying liquid to said tank in such volume as to maintain a given level of liquid in the tank and trough with a substantially constant flow through the latter, a settling tank, said trough having its bottom wall and at least the lower portions of its side walls passing through the upper portion of said settling tank below the upper edges of the walls of the latter whereby said settling tank is adapted to contain liquid to a level above the bottom wall of the trough portion therein, said trough having an opening through said bottom wall portion within the settling tank, a spreading and feeding means for receiving material from said bin and depositing it at a predetermined rate in the liquid in said trough at a place intermediate said first tank and said opening, said opening providing means whereby heavy portions of the material being separated may settle out into said settling tank while the lighter portions of said material are carried across said opening by the liquid flowing through the trough, and means adjustable to vary the size of said opening.

3. In a material separation apparatus, a bin to receive the material to be separated, a tank, a trough including spaced side walls and a bottom wall, said trough communicating at one end with the upper portion of said tank to continuously receive liquid therefrom, means for supplying liquid to said tank in such volume as to maintain a given level of liquid in the tank and trough with a substantially constant flow through the latter, a settling tank, said trough having its bottom wall and at least the lower portions of its side walls passing through the upper portion of said settling tank below the upper edges of the walls of the latter whereby said settling tank is adapted to contain liquid to a level above the bottom wall of the trough portion therein, said trough having an opening through said bottom wall portion within the settling tank, a spreading and feeding means for receiving material from said bin and depositing it at a predetermined rate in the liquid in said trough at a place intermediate said first tank and said opening, said opening providing means whereby heavy portions of the material being separated may settle out into said settling tank while the lighter portions of said material are carried across said opening by the liquid flowing through the trough, means adjustable to vary the size of said opening, and means adjustable to vary the rate of supply of liquid to the first mentioned tank and thus the rate of flow of liquid in said trough.

4. In a material separation apparatus, a tank, a trough including spaced side walls and a bottom wall, said trough communicating at one end with the upper portion of said tank to continuously receive liquid therefrom, means adjustable to vary the rate of supply of liquid to said trough, said trough including spaced side walls and a bottom wall, a settling tank, said trough crossing said settling tank and disposed partly within the upper portion thereof whereby a length of said side and bottom walls are disposed below the upper edges of the side walls of the tank and the latter may contain liquid to a level above that of the bottom wall of the trough, said trough having an opening in the bottom wall thereof within the settling tank, adjustable means for feeding material to be separated to the liquid in said trough at a place intermediate said first tank and said opening and means adjustable to vary the size of said opening measured along the length of said trough whereby on adjustment of said means and the means for varying the supply of liquid to the trough the action of the apparatus as to the relative weights of the materials which will be carried across said opening by the flow of water in the trough and those that will settle through said opening may be widely varied.

JOSEPH M. AURILIO.
JACK H. SCHECTER.

REFERENCES CITED

The following references are of record in the file of this patent:

UNITED STATES PATENTS

| Number | Name | Date |
|---|---|---|
| Re. 16,673 | Bethke | July 12, 1927 |
| 844,253 | Cordero | Feb. 12, 1907 |
| 1,135,754 | Bell | Apr. 13, 1915 |
| 1,505,024 | Henry | Aug. 12, 1924 |
| 2,025,841 | Young | Dec. 31, 1935 |
| 2,223,468 | Spencer | Dec. 3, 1940 |
| 2,293,664 | Roberts | Aug. 18, 1942 |
| 2,315,436 | McNeill | Apr. 6, 1943 |

FOREIGN PATENTS

| Number | Country | Date |
|---|---|---|
| 102,143 | Germany | Mar. 11, 1899 |
| 212,436 | Great Britain | Mar. 13, 1924 |